Nov. 16, 1965   N. I. BOHLIN   3,217,373
COUPLING OR LOCKING DEVICE
Filed March 13, 1964
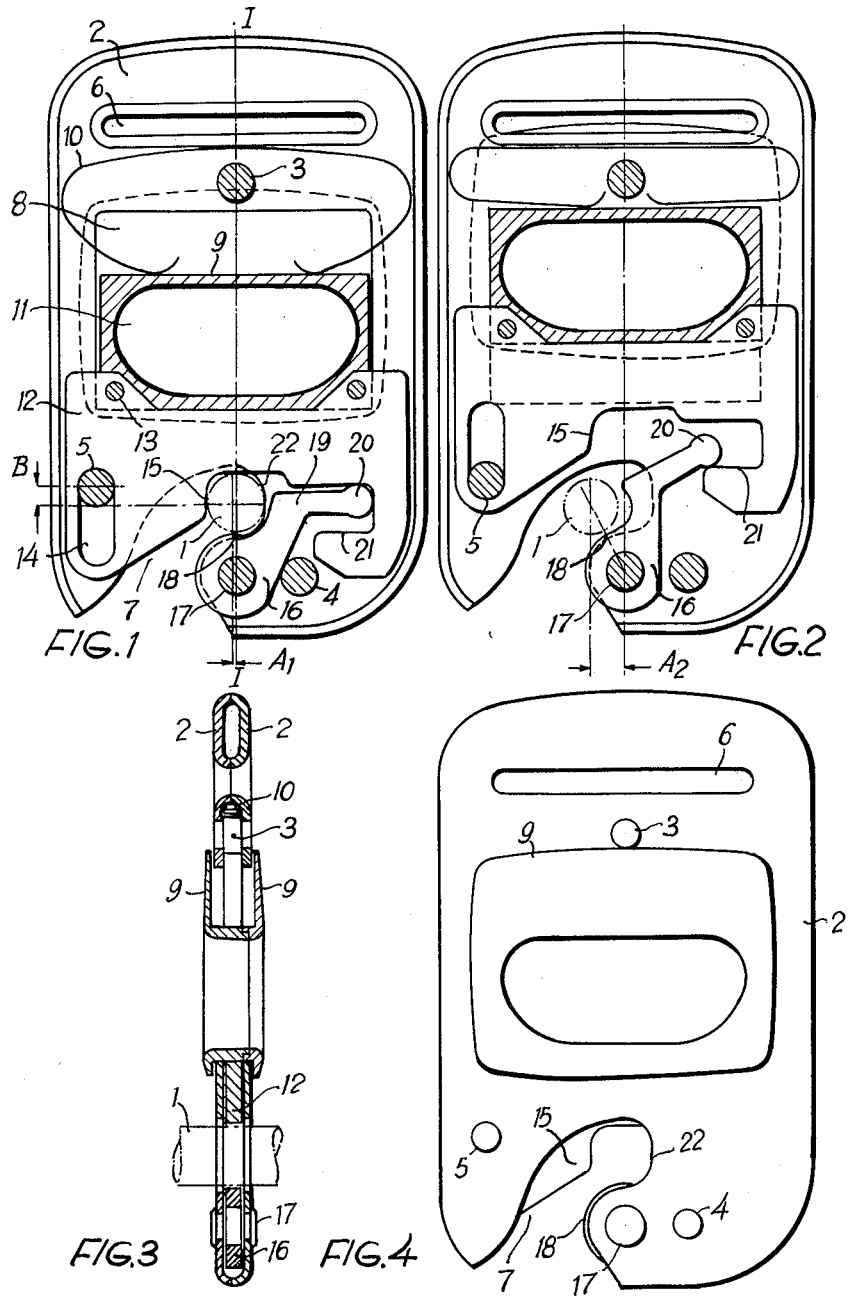

3,217,373
COUPLING OR LOCKING DEVICE
Nils Ivar Bohlin, Goteborg, Sweden, assignor to Aktiebolag Volvo, Goteborg, Sweden, a corporation of Sweden
Filed Mar. 13, 1964, Ser. No. 351,630
Claims priority, application Sweden, Mar. 30, 1963, 3,539/63
4 Claims. (Cl. 24—239)

This invention relates to a releasable device for coupling together two parts, such as a buckle for a safety belt in a vehicle and a loop or the like. The buckle comprises a hook adapted to engage the loop and a release member which under the action of a spring is normally kept in locking position in which it prevents the hook from being moved out of engagement with the loop, said release member being displaceable to a releasing position in which the hook can be disengaged from the loop.

In prior-art coupling devices of this kind the hook has a fixed contact surface for the loop and the release member is provided with a cam-like projection which displaces the loop laterally on the contact surface (out of engagement) in order to facilitate disengagement. If the coupling parts are released while under tensile stress great friction occurs between the hook and the loop and a considerable force is required to push the coupling parts away from each other. The releasing operation is rendered still more difficult if the loop under the action of a previous tensile force on the parts has made a local deformation (dent) in the contact surface of the hook. To prevent such deformation the hook member is made if required of hardened, comparatively expensive material. The consequent rise in cost of the buckle is sometimes of importance if the hook member is made in one piece with the primary load-taking part of the buckle which part requires most of the material for the buckle.

The primary object of the present invention is to provide a coupling or locking device which avoids the above-named inconvenience. Other objects and advantages of the invention will be apparent from the following description and from the drawings.

An embodiment of the invention is described more closely with reference to the annexed drawings in which FIG. 1 is a longitudinal sectional view of a coupling member in engagement with a loop member shown in chain-dotted lines;

FIG. 2 is a sectional view corresponding to FIG. 1 with the coupling member in releasing position;

FIG. 3 is a section taken along the line I—I in FIG. 1, and

FIG. 4 is a lateral elevation of the coupling device.

The loop member cooperating with the coupling device consists of a loop 1 or the like, preferably of a strong I-shaped rod of round cross-sectional shape which is firmly secured to the floor or is the end portion of a belt part anchored to the vehicle. The coupling device or buckle comprises a casing 2 which consists of two corresponding parts having edges bent toward each other, the parts of the casing being secured to each other by means of rivets 3, 4, 5 or other connecting means. Near one of its ends the casing 2 has an oblong hole 6 the long sides of which make an angle of 90° with a vertical line of the buckle as viewed in the drawing. Through this hole a belt portion of a safety belt, not shown, can be passed for slidable or firm connection with the coupling device. At the opposite end the casing has a hook-like recess 7 adapted to receive the loop 1. Further, an opening 8 is provided for a handle 9 which is displaceable in the casing 2 and is acted upon by a spring 10 which tends to force the handle 9 in a direction toward the recess 7. The handle 9 has a grip hole 11 and may be made of plastic, metal or other suitable material. Secured to the handle 9 by means of rivets 13 is a release member 12 consisting of a metal plate which is guided in the casing 2 and has an oblong hole 14 for the rivet 5 which consequently limits the movement of the member 12 in both directions. The release member has a locking part 15 which in the locking position projects into the recess 7 and partly closes the opening of the recess 7 behind the loop 1. Adjacent to the locking part 15 the member 12 is so shaped as to be forced back against the action of the spring 10 when the loop 1 enters the hook shaped recess 7.

At the place where the recess 7 forms the nose of the hook an engaging member 16 is mounted for angular movement in the casing 2 on a pivot 17 and has a circular edge portion 18 which extends radially slightly outside the corresponding portion of the casing 2 and forms the load-taking part of the hook if the loop and the casing are tensioned. In order to prevent local deformation of or damage to the edge portion 18 due to the contact pressure of the loop under the action of a substantial pulling power the engaging member 16 is made of a hard and wear-resisting material, such as hardened steel. The engaging member 16 also has a projection 19 which in the locking position is located slightly inside the inner edge of the recess 7 in the casing 2 and forms a recess for the loop 1. The projection 19 has an extension in the form of a lever 20 with which a certain clearance fits in a slot 21 in the release member 12. Upon movement of the release member to one (upper) or other (lower) end position the engaging member 16 is swung about the pivot 17 and its clockwise movement as viewed in the drawing is limited by engagement with the rivet 4.

If the buckle is to be coupled to the loop the parts of the buckle assume the positions shown in FIGS. 1 and 4. The release member 12 is kept by the spring 10 in its lower end position (locking position) defined by engagement between the rivet 5 and the upper end of opening 14, and the lever 20 of the engaging member 16 assumes a position with a certain clearance with respect to the lower contact surface of the slot 21. If the loop 1 is forced against the lower (inclined) edge of the release member 12 this edge yields and opens the hooked-shaped recess 7 so that the loop is guided toward the inner end of the recess. In this position the locking part 15 of the release member 12 is forced down by the spring 10 behind the loop 1, the location of the inner edge surface 22 of the recess being such that the loop without significant clearance finds room between this surface and the locking part 15. The point of contact between the loop and the edge portion 18 of the engaging member 16 is then located substantially on the vertical line of the buckle through the center of the oblong hole 6 and the center of the pivot 17 or at a slight distance $A_1$ from said line. Consequently, a tensile force acting on the loop and the buckle has an immaterial or no component tending to discharge the loop from the buckle.

To release the coupling device the handle 9 is pulled upwards against the action of the spring 10 and the release member 12 is displaced in the same direction so that the locking part 15 is withdrawn into the casing 2 and opens the recess 7 for the loop 1. During the first part of the movement of the locking part 15 the engaging member 16 is not actuated and remains in its position because of the clearance between the lower contact surface of the slot 21 and the lever 20, but as soon as the lever 20 comes into contact with the lower surface of the slot the engaging member 16 is turned counter-clockwise resulting in that the point of engagement between the loop 1 and the edge portion 18 of the engaging member will be displaced away from the vertical line through the pivot 17. Under the action of the tensile force on the loop and the buckle the consequent off-center engagement indicated at $A_2$ in FIG. 2 results in a component force strong enough to move the loop out of engagement and to separate it from the buckle.

Due to the fact that the engagement between the loop 1 and the engaging member 16 or in other words the mutual position of said parts is not changed during the movement of the engaging member from the locking position to the released position while a tensile force is acting on the buckle and the loop, no sliding friction occurs during the releasing operation and, consequently, a very inconsiderable force is required for releasing the buckle from the loop even if said tensile force is considerable at that time. Since the point of contact with the engaging member lies on a surface of suitably hardened material, there is no risk of a deformation or dent that would render the release difficult. Due to the fact that the relative amount of the engaging member 16 of the total amount of material of the buckle is inconsiderable the use of a hardened and comparatively more expensive material results in a small rise in cost only. Although a hardened material is preferred for the engaging member a non-hardened material may be used if a certain consequent deformation at the point of engagement does not materially effect the releasing action because of the above named off-center engagement in the releasing position and also because of the above named fact that the position of the loop relative to the engaging member remains unchanged in contrast to conventional buckles.

On releasing the device without simultaneously applying tensile force on the buckle and the loop positive disengagement of the loop is ensured due to the fact that the projection 19 of the engaging member 16 is adapted during movement of the engaging member to the releasing position to actuate the loop in a manner such that the loop though not being in forcible contact with the engaging member will be positively moved to a position in which the above named off-center engagement is sufficient to disengage the loop from the buckle.

In order to prevent unintended movement of the release member 12 from the locking to the releasing position under the action of an inertia force due to a rapid dynamic load in which the buckle is involved, for instance if it is part of a safety belt in a colliding vehicle, the buckle is arranged in the following manner.

As viewed in FIG. 1 the rivet 5 is located at such a distance B above the horizontal line through the center of the loop 1 and the point of contact between the locking part 15 and the loop 1 that the horizontal component force which exerts pressure on the locking part 15 and which depends on the above named suitably chosen distance $A_1$ and on the tensile force acting on the buckle and the loop results in that the release member will occupy an inclined (oblique) position relative to its guiding means in the casing 2 and thereby create a wedge action which is sufficient for preventing movement of the release member due to the above named inertia force.

The invention is not limited to the embodiment illustrated and described which can be modified within the scope of the annexed claims.

What is claimed is:

1. A releasable device for coupling together two parts, one of said parts comprising a casing, said casing having a recess forming a hook with a nose, said hook being adapted to engage the second of said parts, a movable release member mounted in said casing and having a locking part projecting into said recess and closing the opening thereof behind said second part, resilient means beiasing said release member to locking position, means for moving said release member from locking to releasing position, and an engaging member pivotally mounted on the nose of said hook and comprising a circular edge portion extending radially outside said nose and a projection engageable by said release member, the locking part of said release member being moved out of engagement with said second part before actuating said engagement member to displace the point of contact between said second part and said edge portion to a position in which said second part is out of engagement with said hook.

2. A device as set forth in claim 1 wherein said second part is a substantially loop-shaped member of round cross-sectional shape.

3. A device as set forth in claim 1 wherein said release member is provided with a slot cooperating with said projection of said engaging member for turning the engaging member during movement of the release member to releasing position.

4. A device as set forth in claim 1 wherein the points of contact between said second part and said engaging member on one hand and between said second part and said release member on the other hand are located such that in the locking position the point of engagement between said second part and said engaging member is positioned substantially on the line of direction through the pivot axis of the engaging member of a tensile force acting on said two parts.

References Cited by the Examiner

UNITED STATES PATENTS

| 1,128,719 | 2/1915 | Poppenhusen. | |
| 1,667,957 | 5/1928 | Stevenson | 24—241 |
| 2,595,450 | 5/1952 | Coffing | 294—83 |
| 2,665,163 | 1/1954 | Gross | 244—151 |
| 2,666,664 | 1/1954 | Johnson | 294—83 |
| 2,722,449 | 11/1955 | Harley | 294—83 |

WILLIAM FELDMAN, *Primary Examiner.*

BOBBY R. GAY, *Examiner.*